US006492462B2

(12) United States Patent
Bitler et al.

(10) Patent No.: US 6,492,462 B2
(45) Date of Patent: Dec. 10, 2002

(54) SIDE CHAIN CRYSTALLINE POLYMER AS RHEOLOGY MODIFIER FOR CROSSLINKED POLYMER

(75) Inventors: Steven P. Bitler, Menlo Park, CA (US); David D. Taft, Atherton, CA (US); Ray F. Stewart, Redwood City, CA (US)

(73) Assignee: Landec Corporation, Menlo Park, CA (US)

(*) Notice: Subject to any disclaimer, the term of this patent is extended or adjusted under 35 U.S.C. 154(b) by 0 days.

(21) Appl. No.: 09/741,530

(22) Filed: Dec. 19, 2000

(65) Prior Publication Data

US 2001/0002414 A1 May 31, 2001

Related U.S. Application Data

(63) Continuation of application No. 09/007,921, filed on Jan. 16, 1998, now abandoned.

(51) Int. Cl.⁷ .................. C08L 51/00; C08L 25/14; C08L 33/02; C08L 25/06; C08L 67/06
(52) U.S. Cl. .................. 525/107; 525/64; 525/65; 525/66; 525/68; 525/69; 525/74; 525/77; 525/92 R; 525/92 C; 525/92 F; 525/92 H; 525/92 K; 525/117; 525/118; 525/119; 525/120; 525/121; 525/122; 525/123; 525/132; 525/142; 525/143; 525/144; 525/145; 525/149; 525/168; 525/169; 525/170; 525/182; 525/183; 525/184; 525/199; 525/200; 525/208; 525/218; 525/221; 525/227; 525/240; 525/241; 525/263; 525/293; 525/305; 525/403; 525/404; 525/405; 525/407; 525/408; 525/409; 525/410; 525/411; 525/412; 525/414; 525/420; 525/423; 525/424; 525/425; 525/426; 525/429; 525/438; 525/440; 525/442; 525/444; 525/445; 525/446; 525/4
(58) Field of Search .................. 525/107, 263, 525/305, 524, 64, 65, 66, 68, 69, 92 R, 74, 77, 92 C, 92 F, 92 H, 92 K, 117, 118, 119, 120, 121, 122, 123, 132, 142, 143, 144, 145, 149, 168, 169, 170, 182, 183, 184, 199, 200, 208, 218, 221, 227, 240, 241, 293, 403, 404, 405, 407, 408, 409, 410, 411, 412, 414, 420, 423, 424, 425, 426, 429, 438, 440, 442, 444, 4

(56) References Cited

U.S. PATENT DOCUMENTS

| 3,674,893 A | 7/1972 | Nowak et al. ............... 260/836 |
| 3,718,714 A | 2/1973 | Comstock et al. ........... 260/862 |
| 3,721,642 A | 3/1973 | Schalin et al. ................ 260/40 |
| 3,772,241 A | 11/1973 | Kroekel et al. ................ 260/40 |
| 3,842,142 A | 10/1974 | Harpold et al. .............. 260/862 |
| 4,125,702 A | 11/1978 | Cooke et al. ................ 526/323 |
| 4,160,759 A | 7/1979 | Gardner et al. ................ 260/40 |
| 4,161,471 A | 7/1979 | Kassal ........................ 260/40 |
| 4,245,068 A | 1/1981 | Brewbaker et al. .......... 525/447 |
| 4,284,736 A | 8/1981 | Comstock et al. ........... 525/169 |
| 4,288,571 A | 9/1981 | Comstock et al. ........... 525/170 |
| 4,349,651 A | 9/1982 | Smith .......................... 526/263 |
| 4,358,571 A | 11/1982 | Kaufman et al. ............ 525/524 |
| 4,374,215 A | 2/1983 | Atkinson .................... 523/514 |
| 4,420,605 A | 12/1983 | Kaufman ...................... 528/94 |
| 4,430,445 A | 2/1984 | Miyake et al. ................. 521/38 |
| 4,491,642 A | 1/1985 | Atkins ......................... 523/515 |
| 4,555,534 A | 11/1985 | Atkins ......................... 523/507 |
| 4,659,779 A | 4/1987 | Bagga et al. ................. 525/118 |
| 4,673,706 A | 6/1987 | Atkins ........................... 525/31 |
| 4,689,388 A | 8/1987 | Hirai et al. ................... 824/545 |
| 4,701,378 A | 10/1987 | Bagga et al. ................ 428/414 |
| 4,742,148 A | 5/1988 | Lee et al. ..................... 528/117 |
| 4,933,392 A | 6/1990 | Andrews et al. ............. 525/110 |
| 5,290,854 A | 3/1994 | Ross et al. ...................... 525/33 |
| 5,428,105 A | 6/1995 | Mc Garry et al. ............. 525/69 |
| 5,504,151 A | 4/1996 | Fisher et al. ................... 525/49 |
| 5,552,478 A | 9/1996 | Fisher ............................ 525/41 |
| 5,589,538 A | 12/1996 | Rex et al. ...................... 525/28 |
| 5,665,822 A * | 9/1997 | Bitler et al. ............... 525/92 C |
| 6,255,367 B1 * | 7/2001 | Bitler et al. ................. 525/522 |

FOREIGN PATENT DOCUMENTS

| EP | 0 362 787 | 11/1989 |
| JP | 7-268184 A2 * | 10/1995 |
| WO | WO 96/27641 | 12/1996 |

OTHER PUBLICATIONS

Pp. 48 to 78 (Chapter 4 by Kenneth E. Atkins) in "Sheet Molding Compounds", edited by Hamid Kia (1993).
Plastics Compounding, Jul./Aug. 1988, pp. 35–45.
Chapters 11 and 14 from Printed Circuits Handbook, edited by Clyde F. Coombs, McGraw Hill, 1988.
Chapter 5 of the Multilayer Printed circuit Board Handbook, edited by J. A. Scarlett; Electrochemical Publications Limited, Scotland, 1985.

* cited by examiner

Primary Examiner—Robert E. L. Sellers
(74) Attorney, Agent, or Firm—Sheldon & Mak; Jeffrey G. Sheldon

(57) ABSTRACT

The rheological properties of a crosslinkable resin system are modified by the presence of a side chain crystalline (SCC) polymer (or a similar crystalline polymer which melts over a narrow temperature range). The polymer dissolves in the curable system at temperatures above the melting point of the crystalline polymer ($T_p$), but when the system is then cooled to a temperature below $T_p$, at least partially forms a separate phase in the curable system. Below $T_p$, this separate phase substantially increases the viscosity of the curable system (i.e. makes it thicker than the same system without the crystalline polymer). This is particularly valuable for sheet molding composites (SMCs) in which the increase in viscosity makes the composites less tacky, and for dry film resists (DFRs). Above $T_p$, the curable system containing the dissolved crystalline polymer has a viscosity which is substantially less than its viscosity below $T_p$.

53 Claims, No Drawings

SIDE CHAIN CRYSTALLINE POLYMER AS RHEOLOGY MODIFIER FOR CROSSLINKED POLYMER

CROSS-REFERENCE TO RELATED APPLICATIONS

This application is a continuation of copending, commonly assigned, application Ser. No. 09/007,921, filed Jan. 16, 1998, abandoned, the entire disclosure of which is incorporated herein by reference. It is also related to copending, commonly assigned, application Ser. No. 09/008,676 filed Jan. 16, 1998, i.e.

BACKGROUND OF THE INVENTION

1. Field of the Invention

This invention relates to polymeric materials which modify the rheological behavior of crosslinkable resin systems.

2. Introduction to the Invention

Crosslinkable resin systems are well known. It is known that in order to produce such a system which is relatively stable in storage, one of the active chemical moieties (e.g., a catalytic moiety or a reactive moiety) can be present in a "latent" form, which can be activated (by heating or otherwise) when rapid reaction is desired. Reference may be made for example to U.S. Pat. Nos. 4,349,651, 4,358,571, 4,420,605, 4,430,445, 4,659,779, 4,689,388, 4,701,378, 4,742,148 and 4,933,392 and European Patent Publication No. 362787A2. Copending, commonly assigned, U.S. application Ser. Nos. 08/726,739, 08/726,740 and 08/726,741, all abandoned (each of which was filed Oct. 15, 1996 and claims priority from U.S. application Ser. No. 08/399,724 filed Mar. 7, 1995, now abandoned) and corresponding International Application No. PCT/US96/03023 (published Sep. 12, 1996, as International Publication No. WO-96/27641) disclose particularly valuable latent materials comprising an active chemical moiety which is bonded to a side chain crystalline (SCC) polymer moiety or to another crystalline polymeric moiety which melts over a narrow temperature range. These latent materials, which are referred to in the applications as polymeric modifying agents, are preferably in the form of particles having an average size of 0.1 to 50 microns. Copending, commonly assigned U.S. application Ser. No. 08/710,161 (Docket No. 10762-4 filed Sep. 12, 1996), abandoned, and corresponding International Application No. PCT/US 97/16019 (which was not published at the date of this application) disclose that even when there is no chemical bond between the active and polymeric moieties, a physical bond between the moieties can produce a lesser but still useful latent effect. Application Ser. Nos. 08/726,739, 08/726,740, 08/726,741 and 08/710,161 have all been abandoned in favor of a continuation-in-part application, Ser. No. 09/216,520, filed Dec. 16, 1998, U.S. Pat. No. 6,255,367. It is also known that curable resin systems tend to shrink when they cure, and that in some systems this tendency can be lessened or overcome by adding various polymeric additives; such additives are referred to as low profile additives (often abbreviated to "LPA"s). Reference may be made for example to pages 48 to 78 (Chapter 4 by Kenneth E. Atkins) in "Sheet Molding Compounds", edited by Hamid Kia (1993), Plastics Compounding, July/August 1988, pages 35–45, and U.S. Pat. Nos. 3,674,893, 3,718,714, 3,721,642, 3,772,241, 3,842,142, 4,125,702, 4,160,759, 4,161,471, 4,245,068, 4,284,736, 4,288,571, 4,374,215, 4,491,642, 4,555,534, 4,673,706, 5,290,854, 5,428,105, 5,504,151, 5,552,478 and 5,589,538.

The disclosure of each of the U.S. patents and patent applications, International and European patent publications, and literature references referred to in the preceding paragraph is incorporated herein by reference for all purposes.

SUMMARY OF THE INVENTION

We have discovered, in accordance with the present invention, that the rheological properties of a crosslinkable resin system can be substantially improved by the presence of an SCC polymer (or a similar crystalline polymer which melts over a narrow temperature range). The polymer must be one which (a) at least partially dissolves in the curable system at temperatures above the melting point of the crystalline polymer ($T_p$) and (b) when the curable composition is (i) heated to a temperature above $T_p$ under conditions such that the resin does not cure and (ii) is then cooled to a temperature below $T_p$, at least partially forms a separate phase in the curable system. At temperatures below $T_p$, the presence of this separate phase substantially increases the viscosity of the curable system (i.e. makes it thicker than the same system without the crystalline polymer). This is particularly valuable for sheet molding composites (SMCs), in which the increase in viscosity makes the composites less tacky and, therefore, (a) easier to handle cleanly, and (b) more likely to yield a cured product having a surface free from flaws. Above $T_p$, the curable system containing the dissolved crystalline polymer has a viscosity which is substantially less than its viscosity below $T_p$.

The crystalline polymer can be, but need not be, chemically or physically bound to an active chemical moiety which will take part in the reaction which forms the cured polymer. We believe, therefore, that under appropriate circumstances, some latent materials of the kind described in the copending, commonly assigned U.S. patent applications referred to above will function as RHMs. However, that possibility is not disclosed in those U.S. patent applications or the corresponding PCT applications. Under these circumstances, the extent to which our discovery can be the subject of patent protection may vary from country to country. Accordingly, and since this specification will serve not only as the specification for this U.S. patent application, but also as the priority document for corresponding applications elsewhere, the present invention is broadly defined as any product or process which embodies our discovery and which can properly be the subject of patent protection.

In a first preferred aspect, this invention provides a polymeric composition which comprises
1. a matrix material which
   (a) provides a continuous phase, and
   (b) comprises precursors which will react together to form a crosslinked polymer;
   and
2. a rheological modifier (RHM) which
   (a) comprises a crystalline polymer having an onset of melting temperature $T_o$ and a peak melting temperature $T_p$ which is (i) from 20° C. to 200° C., and (ii) such that $T_p - T_o$ is less than $T_p^{0.7}$,
   (b) is uniformly distributed in the matrix material,
   (c) is at least partially soluble in the matrix material when the composition is subjected to a treatment which consists of maintaining the composition at a temperature above $T_p$ under conditions such that the precursors do not react together to form a crosslinked resin, and
   (d) becomes at least partially insoluble in the matrix material when the composition is subjected to said treatment at a temperature above $T_p$ and is then cooled to a temperature below $T_o$, the composition (A) having a viscosity above $T_p$ which is less than its viscosity below $T_o$; and (B) having a viscosity at a temperature below $T_o$ which is substantially greater than the viscosity at the same temperature of a composition which is identical except that it does not contain the rheological modifier.

Preferably, the matrix material and the RHM and the relative amounts thereof are such that (a) the composition, or (b) if the composition contains solid fillers, a composition which is identical except that it does not contain the solid fillers, (A) has a viscosity at $(T_p-10)°$ C. which is at least twice, preferably at least 5 times, its viscosity at $(T_p+10)°$ C.; and/or (B) has a viscosity at 20° C. which is at least twice, preferably at least 5 times, the viscosity of a composition which is identical except that it does not contain the RHM.

The composition may also have at least one of the following characteristics, each of which provides an alternative or additional distinction over the disclosure of the commonly assigned U.S. applications and their PCT equivalents referred to above.

(1) At least 10%, at least 20% or at least 30% of the crystalline polymer is present in the form of particles or other discrete volumes which do not contain any material which takes part in the reaction which forms the crosslinked polymer.

(2) The composition, when maintained at 40° C., doubles in viscosity in less than 240 hours, e.g. in less than 24 hours.

(3) The RHM is not present in the form of discrete particles.

(4) The RHM is added to the matrix material in the form of particles having an average size of at least 75 microns, or as a solution in a solvent.

(5) When the composition is heated from $(T_p-10)°$ C. to $(T_p+10)°$ C., there is an increase by a factor of less than 50, e.g., less than 5, in the effective concentration of each of the materials which takes part in the reaction which forms the crosslinked polymer.

It is to be understood that these characteristics (1) to (5) are not intended to represent factors which will be technically advantageous.

In a second preferred aspect, this invention provides a method of making such a composition which comprises (A) dispersing the RHM, e.g. a solution of the RHM or particles of the RHM, in at least part of the matrix material;

(B) heating the product of step (A) to a temperature above $T_p$ under conditions such that the precursors do not react together to form a crosslinked polymer; and (C) cooling the heated dispersion to a temperature below $T_p$.

In a third preferred aspect, this invention provides a method of making a crosslinked polymer which comprises subjecting a composition as defined above to conditions which cause the precursor to react to form a crosslinked polymer.

DETAILED DESCRIPTION OF THE INVENTION

Definitions and Abbreviations

In this specification, parts and percentages are by weight, viscosities are in centipoise and are measured using a Brookfield LVT viscometer, temperatures are in ° C., and $T_o$, $T_p$ and heat of fusion are determined using a differential scanning calorimeter (DSC), (at a rate of temperature change of 10° C./min on the second heat by cycle). $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$. The abbreviations $M_w$ and $M_n$ are used to denote weight average and number average molecular weight respectively. The abbreviation CxA is used to denote an n-alkyl acrylate in which the n-alkyl group contains x carbon atoms, the abbreviation Cx alkyl is used herein to denote an n-alkyl group which contains x carbon atoms, and the abbreviations CxM is used to denote an n-alkyl methacrylate in which the n-alkyl group contains x carbon atoms. Other abbreviations are given elsewhere in the specification.

Matrix Materials

The terms "matrix" and "matrix materials" are used in this specification to denote any material or mixture of materials comprising a precursor which will react with itself to form a crosslinked polymer, or two or more precursors which will react with each other to form a crosslinked polymer, or one or more precursors which will react with one or more additional materials (added at a later stage) to form a crosslinked polymer. One or more of the precursors can be in latent form. The matrix generally comprises at least one solid or liquid material which provides a continuous phase in which the RHM is distributed. The matrix can include, in addition to the precursor(s) and the RHM, one or more other materials. Such materials can be compounds which influence the nature or the rate of the crosslinking reaction, and which can be in latent form, e.g. catalysts, polymerization inhibitors, and polymerization initiators. Such materials can also be added at a later stage, prior to the crosslinking reaction. Initiators may be present, for example, in amount 0.1 to 5%, and include organic derivatives of hydrogen peroxide such as para-t-butyl peroxybenzoate and 1,1-di-t-amyl peroxycyclohexane. Such other materials can also be, for example, materials which affect the physical properties of the curable resin or of the cured resin, for example fillers, LPAs, thickening agents, mold release agents, viscosity reducers, wetting agents and colorants. Such other materials can also be coadditives as disclosed in the pending U.S. applications referred to above. Suitable fillers include inorganic and organic materials, including fibrous fillers such as glass, Kevlar or carbon fibers, hollow glass microspheres, hollow polymeric microspheres, calcium carbonate and alumina trihydrate. The amount of filler, if present, may be 10 to 70%, for example 15 to 35%, and may be such that the curable composition has the consistency of a paste or is even a self-supporting solid. The amount of mold release agent, if present, may be 1 to 4%; mold release agents include calcium and zinc sterates. The amount of colorant, if present, may be 0.5 to 4%. The amount of thickener, if present, may be 0.1 to 3%; thickeners include magnesium oxide and calcium hydroxide.

The invention is particularly useful in the preparation of molded products of a cured resin derived from an unsaturated polyester (optionally with styrene), a vinyl ester, an acrylic resin, or an epoxy resin. The term "unsaturated polyester" is used in this specification in its conventional sense to mean a polymer in which the monomer units are linked to each other through an ester group and which contains carbon—carbon double bonds that are capable of undergoing further polymerization. The term "vinyl ester" is likewise used in its conventional sense to denote a subclass of the unsaturated polyesters, namely those which contain vinyl groups, in particular polymers made by addition reactions involving polyepoxides and unsaturated acids. In order to prepare crosslinked thermoset resins from these polymers, they are generally dissolved in a monomer such as styrene and then copolymerized with the monomer. Other precursors include cyanate esters, isocyanurates, imides, bismaleimides, ureas, cyanoacrylates, epoxy novolac, resins, polyurethanes and phenolic resins.

The invention is particularly useful for reducing the tack at ambient temperatures of a curable resin composition which contains a relatively large amount of filler and/or other ingredient (e.g. 20 to 50% of glass fibers, or of hollow glass or polymeric microspheres), so that the composition has the consistency of a paste, or even is a self-supporting solid. Applications of this type include SMCs, particularly SMCs based on a mixture of an unsaturated polyester and styrene or another unsaturated comonomer. The invention is also useful for improving the moldability of curable compositions at temperatures above $T_p$. The RHM may also improve the release properties of the cured resin from a mold, and/or reduce the tendency of cured resin articles to stick to each other. Thus the invention is particularly useful in the preparation of dry film resists (DFRs) and flexographic print plates, as described for example in The Multilayer Printed Circuit Board, J A Scarlett (1985), and the Printed Circuit Handbook, Clyde F. Coombs (1988).

For further details of suitable precursors of the cured resin and other ingredients, reference should be made to the documents referred to above and incorporated herein by reference, and to (a) Handbook of Epoxy Resins by Henry Lee and Kris Neville; 1967; McGraw-Hill Inc.

(b) Epoxy Resins, Chemistry and Technology 2nd Edition, edited by Clayton A. May; 1988; Marcel Dekker, Inc.

(c) Polyurethanes, Chemistry, Technology and Applications by Z. Wirpsza; 1993; Ellis Norwood Ltd.

(d) The ICI Polyurethanes Book by George Woods; 1987; John Wiley & Sons, Inc.

(e) Structural Adhesives, Chemistry and Technology, edited by S. R. Hartshort; 1986; Plenum Press (f) Test Methods for Epoxy Compounds; published by the Society of the Plastics Industry, Inc., Epoxy Resin Formlations Division (g) Thermal Characterization of Polymeric Materials, edited by Edith A. Turi; 1981; Academic Press, Inc., and (h) Reaction Polymers, edited by Wilson F. Gum et al, Hanser Publishing.

The disclosure of each of documents (a) to (h) above is incorporated herein by reference.

RHMs

The crystalline polymer in the RHM (the term "crystalline polymer" being used to include a crystalline polymeric moiety which is chemically bound to a non-crystalline moiety) can be a single polymer or a mixture of polymers, and the polymer can be a homopolymer, or a copolymer of two or more comonomers, including random copolymers, graft copolymers, block copolymers and thermoplastic elastomers. Preferably at least part of the polymeric moiety is derived from a side chain crystallizable (SCC) polymer. The SCC polymer may for example be derived from one or more acrylic, methacrylic, olefinic, epoxy, vinyl, ester-containing, amide-containing or ether-containing monomers. The molecular weight of an SCC polymer is relatively unimportant to its $T_p$, but is generally an important factor in determining the $T_p$ of other polymers. The preferred SCC polymeric moieties are described in detail below. However, the invention includes the use of other crystalline polymers having the desired properties. Such other polymers include for example polymers in which the crystallinity results exclusively or predominantly from the polymer backbone, e.g. polymers of a-olefins containing 2 to 12, preferably 2 to 8, carbon atoms, e.g. polymers of monomers having the formula $CH_2=CHR$, where R is hydrogen, methyl, propyl, butyl, pentyl, 4-methylpentyl, hexyl or heptyl, as well as other polymers such as polyesters, polyamides, and polyalkylene oxides, for example polytetrahydrofuran.

It is important that the polymeric moiety should melt over a relatively small temeprature range. The closer $T_p$ is to room temperature, the more rapid the transition should preferably be. Thus $T_p-T_o$ is preferably less than $T_p^{0.7}$, particularly less than $T_p^{0.6}$, $T_o$ and $T_p$ being in ° C. Tp can vary widely, depending on the conditions under which the composition is to be stored, shaped and cured. Thus in general, $T_p$ is preferably at least 25° C., for example 25 to 120° C., preferably 35 to 70° C. $T_p-T_o$ is preferably less than 10° C., particularly less than 8° C., more particularly less than 6° C., especially less than 4° C.

SCC polymers which can be used in this invention include known SCC polymers, e.g. polymers derived from one or more monomers such as substituted and unsubstituted acrylates, methacrylates, fluoroacrylates, vinyl esters, acrylamides, methacrylamides, maleimides, α-olefins, p-alkyl styrenes, alkylvinyl ethers, alkylethylene oxides, alkyl phosphazenes and amino acids; polyisocyanates; polyurethanes; polysilanes; polysiloxanes; and polyethers; all of such polymers containing long chain crystallizable groups. Suitable SCC polymers are described for example in J. Poly. Sci. 60, 19 (1962), J. Poly. Sci, (Polymer Chemistry) 7, 3053 (1969), 9, 1835, 3349, 3351, 3367, 10, 1657, 3347, 18, 2197, 19, 1871, J. Poly. Sci, Poly-Physics Ed 18 2197 (1980), J. Poly. Sci, Macromol. Rev, 8, 117 (1974), Macromolecules 12, 94 (1979), 13, 12, 15, 18, 2141, 19, 611, JACS 75, 3326 (1953), 76; 6280, Polymer J 17, 991 (1985); and Poly. Sci USSR 21, 241 (1979) and in the commonly assigned U.S. patent applications referred to above and their PCT equivalents.

Preferred SCC polymers comprise side chains comprising linear polymethylene moieties containing 12 to 50, especially 14 to 22, carbon atoms, or linear perfluorinated or substantially perfluorinated polymethylene moieties containing 6 to 50 carbon atoms. Polymers containing such side chains can be prepared by polymerizing one or more corresponding linear aliphatic acrylates or methacrylates, or equivalent monomers such as acrylamides or methacrylamides. A number of such monomers are available commercially, either as individual monomers or as mixtures of identified monomers, for example C12A, C14A, C16A, C18A, C22A, a mixture of C18A, C20A and C22A, a mixture of C26A to C40A, fluorinated C8A (AE800 from American Hoechst) and a mixture of fluorinated C8A, C10A and C12A (AE12 from American Hoechst). The polymers can optionally also contain units derived from one or more other comonomers preferably selected from other alkyl, hydroxyalkyl and alkoxyalkyl acrylates, methacrylates (e.g. glycidyl methacrylate), acrylamides and methacrylamides; acrylic and methacrylic acids; acrylamide; methacrylamide;

maleic anhydride; and comonomers containing amine groups. Such other co-monomers are generally present in total amount less than 50%, particularly less than 35%, especially less than 25%, e.g. 0 to 15%. They may be added to modify the melting point or other physical properties of the polymers, in particular so as to make the crystalline polymer more compatible with the precursor(s) and/or the crosslinked resin, and thus promote the desired RHM activity. For example, in one embodiment, the crystalline polymer comprises (a) units derived from a monomer containing an n-alkyl group containing 12 to 50 carbon atoms and (b) at least 10% of units derived from a second monomer; and the matrix material comprises at least 10% of the second monomer or of units which are part of a polymer and are derived from the second monomer; preferably the crystalline polymer contains 10 to 50% of units derived from the second monomer, and the matrix material contains 20 to 50% of the second monomer, e.g. styrene. In another embodiment, the crystalline polymer contains 10 to 50% of units derived from the second monomer, and the matrix material comprises a polymer containing 10 to 70%, based on the matrix material, of units derived from the second monomer; preferably the matrix material comprises precursors for an acrylate polymer and the second monomer is an alkyl acrylate or an alkyl methacrylate in which the alkyl group contains 1 to 4 carbon atoms.

EXAMPLES

The invention is illustrated by the following Examples, some of which are comparative examples, in which the following abbreviations are used.

ST is styrene.

AA is acrylic acid.

MA is methacrylic acid.

HEA is 2-hydroxyethyl acrylate.

C12SH is dodecyl mercaptan.

AIBN is azo bis(isobutyronitrile).

TAO is t-amylperoctoate, available from Witco under the tradename Experox 570.

Aropol is a liquid mixture of 70% of an unsaturated polyester and 30% of styrene, and is available from Ashland Chemicals under the tradename Aropol 2036.

In Examples 1 to 20, the ingredients and amounts thereof shown in the Table below, and 0.1 to 0.5 parts of C12SH, were heated together, with stirring, at about 100° C. for 1–3 hours, while adding 1% of TAO. About 0.5% of TAO was then added to complete the polymerization.

TABLE

| Example No. | 1 | 2 | 3 | 4 | 5 | 6 | 7 | 8 | 9 | 10 |
|---|---|---|---|---|---|---|---|---|---|---|
| C22A | 55 | 70 | 78 | 52 | 76 | 75 | 49 | 64 | 72 | 46 |
| ST | 45 | 30 | 22 | 43 | 28 | 20 | 41 | 26 | 18 | 39 |
| AA | — | — | — | 5 | 5 | 5 | 10 | 10 | 10 | 15 |

| Example No. | 11 | 12 | 13 | 14 | 15 | 16 | 17 | 18 | 19 | 20 |
|---|---|---|---|---|---|---|---|---|---|---|
| C22A | 61 | 69 | 68 | 68 | 72 | 67 | 72 | 78 | 80 | 80 |
| ST | 24 | 16 | 27 | 27 | 24 | 28 | 24 | 17 | 15 | 15 |
| AA | 15 | 15 | 5 | 5 | 4 | 5 | 4 | 5 | 5 | — |
| HEA | — | — | — | — | — | — | — | — | — | 5 |

EXAMPLE 21

C18A (65 g), CIM (20 g), and AA (15 g) were dissolved in toluene (200 g) and AIBN (1 g was added). After degassing with nitrogen for 20 minutes, the mixture was heated at 60° C. for 16 hours. The resulting polymer had $M_w=120,000$ and $T_p=39–40°$ C.

EXAMPLE 22

The polymer prepared in Example 19 (238 g), having an $M_w=181,000$, $M_n=30,000$, $T_o=57°$ C. and $T_p=61°$ C., was heated to 100° C. Glycidyl methacrylate (23.5 g) was added, and the mixture heated at 100° C. with stirring for 1 hour, to yield a polymer having reactive unsaturation.

EXAMPLE 23

The polymer prepared in Example 20 (249 g), having an $M_w=243,000$, $M_n=33,000$, $T_o=56°$ C. and $T_p=60°$ C., was heated to 100° C. Maleic anhydride (10.5 g) was added, and the mixture heated at 100° C. for 1 hour to yield a polymer containing carboxylic groups and reactive unsaturation.

EXAMPLE 24

C18A was polymerized in toluene at 60° C. for 16 hours, using mercaptoethanol as a chain terminator and AIBN as initiator, yielding a polymer having an $M_w$ 4,500. After heating at 80° C. for 4 hours to ensure decomposition of the AIBN, the reaction mixture was cooled to 60° C. and sufficient isocyanatoethyl methacrylate was added to functionalize the terminal hydroxyl groups on the polymer. The product was isolated by precipitation in cold ethanol, filtration and drying. The isolated product (30 g), CIM (35 g), C4A (20 g) and AA (15 g) were reacted together in a solvent mixture of ethyl acetate and toluene at 60° C. for 16 hours. The resulting graft copolymer could be isolated by removing the solvent.

EXAMPLE 25

A paste was formed by mixing the following ingredients 17 parts of Aropol 2036

11.3 parts of a mixture of polystyrene (40%) and styrene (60%), available from Huntsman Chemical Co.

0.3 parts of para-t-butyl peroxybenzoate 2.9 parts of a pigment dispersion, available from Pigment Dispersions Inc. under the tradename Colorant #180211.

0.5 parts of zinc stearate, available from ECC America.

0.5 parts of magnesium oxide, available from Michigan Chemical under the product number 1782.

15 parts of the SCC polymer prepared in Example 1.

The paste was mixed with 25 parts of a chopped roving of glass fibers 25.4 mm (1 inch) in length, available from Johns Manville under the product number #750. The mixture was formed into a sheet molding composite which was placed in an enclosed sheet mold and heated to the cure temperature (about 120° C.).

The above procedure was repeated, except that the SCC polymer was omitted from the paste. The sheet molding composite had substantially more tack than the composite obtained when the SCC polymer was present.

EXAMPLE 26

A photosensitive resin composition was prepared by mixing the following ingredients.

100 parts of a copolymer of C1M (50 parts), C1A (25 parts) and MA (25 parts) having $M_n=70,000$ 50 parts of trimethylolpropane triacrylate 10 parts of polyethylene glycol diacrylate
1 part of dimethylketal
0.05 part of hydroquinene
0.1 part of Methylene Blue
24 parts of the SCC polymer prepared in Example 21.
200 parts of a mixture of methylene chloride (90 parts) and methyl alcohol (10 parts)

The composition was formed into a film. The film was laminated onto a copper substrate to form a photoresist 50 micron thick. A pattern mask was placed over the film, and the resulting assembly was exposed to a superhigh-pressure mercury lamp and then allowed to stand for 20 minutes. The photoresist was developed by a 1% aqueous $NaHCO_3$ solution at 30° C. for 1 minute.

EXAMPLE 27

The SCC polymer prepared in Example 5 (C22A/ST/AA, 67/28/5), 5 g, which had a $T_p$ of about 60° C., was dissolved in a mixture of Aropol 2036 (40 g) and styrene (20 g). The viscosities at various temperatures of the mixture of Aropol and styrene alone, and of the mixture containing the SCC polymer were as follows.

| Temperature | 30° C. | 40° C. | 50° C. | 60° C. |
|---|---|---|---|---|
| Aropol/styrene | 93 | 88 | 73 | 67 |
| Aropol/styrene/SCC | 1820 | 770 | 390 | 140 |

What is claimed is:
1. A polymeric composition which comprises
   1. a matrix material which
      (a) provides a continuous phase, and
      (b) comprises precursors which will react together to form a crosslinked polymer;
   and
   2. a rheological modifier (RHM) which
      (a) comprises a crystalline polymer which is a side chain crystalline (SCC) polymer and which has an onset of melting temperature $T_o$ and a peak melting temperature $T_p$ which is (i) from 20° C. to 200° C., and (ii) such that $T_p - T_o$ is less than $T_p^{0.7}$, at least 10% by weight of the SCC polymer being present in the form of discrete volumes which do not contain any material which takes part in the reaction which forms the crosslinked polymer,
      (b) is uniformly distributed in the matrix material,
      (c) is at least partially soluble in the matrix material when the composition is subjected to a treatment which consists of maintaining the composition at a temperature above $T_p$ under conditions such that the precursors do not react together to form a crosslinked resin, and
      (d) becomes at least partially insoluble in the matrix material when the composition is subjected to said treatment at a temperature above $T_p$ and is then cooled to a temperature below $T_o$;
   the composition
      (A) having a viscosity above $T_p$ which is less than its viscosity below $T_p$; and
      (B) having a viscosity at a temperature below $T_o$ which is substantially greater than the viscosity at the same temperature of a composition which is identical except that it does not contain the rheological modifier.
2. A composition according to claim 1 wherein the matrix material and the RHM and the relative amounts thereof are such that the composition, in the absence of any solid non-polymeric fillers, has a viscosity at $(T_p-10)°$ C. which is at least twice its viscosity at $(T_p+10)°$ C.
3. A composition according to claim 2 wherein the matrix material and the RHM and the relative amounts thereof are such that the composition, in the absence of any solid non-polymeric fillers, has a viscosity at 20° C. which is at least 5 times the viscosity at 20° C. of a composition which is identical except that it does not contain the RHM.
4. A composition according to claim 1 wherein $T_p$ is from 25 to 120° C.
5. A composition according to claim 4 wherein $T_p$ is from 35 to 70° C.
6. A composition according to claim 1 wherein the SCC polymer comprises (a) units derived from a monomer containing an n-alkyl group containing 12 to 50 carbon atoms and (b) at least 10% of units derived from a second monomer; and the matrix material comprises at least 10% of the second monomer or of units which are part of a polymer and are derived from the second monomer.
7. A composition according to claim 6 wherein the second monomer is styrene.
8. A composition according to claim 6 wherein the matrix material comprises precursors for an acrylate polymer and the second monomer is an alkyl acrylate or an alkyl methacrylate in which the alkyl group contains 1 to 4 carbon atoms.
9. A composition according to claim 1 wherein the matrix material comprises an unsaturated polyester and a copolymerizable monomer.
10. A composition according to claim 1 wherein the matrix material comprises precursors for an epoxy resin.
11. A composition according to claim 1 which is in the form of the sheet molding composite.
12. A composition according to claim 1 which is at a temperature below $T_o$ and in which at least 30% by weight of the crystalline polymer is present in the form of discrete volumes which do not contain any material which takes part in the reaction which forms the crosslinked polymer.
13. A composition according to claim 9 wherein the matrix material and the RHM and the relative amounts thereof are such that the composition, in the absence of any solid non-polymeric fillers, has a viscosity at $(T_p-10)°$ C. which is at least 5 times its viscosity at $(T_p+10)°$ C.
14. A composition according to claim 13 wherein the matrix material and the RHM and the relative amounts thereof are such that the composition, in the absence of any solid non-polymeric fillers, has a viscosity at 20° C. which is at least 5 times the viscosity at 20° C. of a composition which is identical except that it does not contain the RHM.
15. A composition according to claim 1 wherein $(T_p-T_o)$ is less than 10° C. and $T_p$ is from 35° C. to 70° C.
16. A composition according to claim 9 wherein the copolymerizable monomer is styrene.
17. A composition according to claim 1 wherein the SCC polymer comprises (a) units derived from an n-alkyl acrylate in which the alkyl group contains 22 carbon atoms, and (b) units derived from styrene.
18. A polymeric composition which comprises
   1. a matrix material which
      (a) provides a continuous phase, and
      (b) comprises precursors which will react together to form a crosslinked polymer; and
   2. a rheological modifier (RHM) which
      (a) comprises a crystalline polymer which is a side chain crystalline (SCC) polymer and which has an onset of melting temperature $T_o$ and a peak melting temperature $T_p$ which is (i) from 20° C. to 200° C., and (ii) such that $T_p - T_o$ is less than $T_p^{0.7}$,
- (b) is uniformly distributed in the matrix material,
- (c) is at least partially soluble in the matrix material when the composition is subjected to a treatment which consists of maintaining the composition at a temperature above $T_p$ under conditions such that the precursors do not react together to form a crosslinked resin, and
- (d) becomes at least partially insoluble in the matrix material when the composition is subjected to said treatment at a temperature above $T_p$ and is then cooled to a temperature below $T_o$;

the composition
- (A) having a viscosity above $T_p$ which is less than its viscosity below $T_p$; and
- (B) having a viscosity at a temperature below $T_o$ which is substantialy greater than the viscosity at the same temperature of a composition which is identical except that it does not contain the rheological modifier; and when the composition is heated from $(T_p-10)°$ C. to $T_p+10)°$ C., there being an increase by a factor of less than 50 in the effective concentration of each of the materials which takes part in the reaction which forms the crosslinked polymer.

19. A composition according to claim 18, wherein the SCC polymer comprises (a) units derived from an n-alkyl acrylate in which the alkyl group contains 22 carbon atoms, and (b) units derived from styrene.

20. A composition according to claim 18 wherein the matrix material and the RHM and the relative amounts thereof are such that the composition, in the absence of any solid fillers, has a viscosity at $(T_p-10)°$ C. which is at least twice its viscosity at $(T_p+10)°$ C.

21. A composition according to claim 20 wherein the matrix material and the RHM and the relative amounts thereof are such that the composition, in the absence of any solid non-polymeric fillers, has a viscosity at 20° C. which is at least twice the viscosity at 20° C. of a composition which is identical except that it does not contain the RHM.

22. A composition according to claim 18 wherein $T_p$ is from 25 to 120° C.

23. A composition according to claim 22 wherein $T_p$ is from 35° C. to 70° C.

24. A composition according to claim 18 wherein the SCC polymer comprises (a) units derived from a monomer containing an n-alkyl group containing 12 to 50 carbon atoms and (b) at least 10% of units derived from a second monomer; and the matrix material comprises at least 10% of the second monomer or of units which are part of a polymer and are derived from the second monomer.

25. A composition according to claim 24 wherein the second monomer is styrene.

26. A composition according to claim 18 wherein the matrix material comprises an unsaturated polyester and a copolymerizable monomer.

27. A composition according to claim 26, wherein the copolymerizable monomer is styrene.

28. A composition according to claim 26 wherein the matrix material and the RHM and the relative amounts thereof are such that composition, in the absence of any solid non-polymeric fillers, has a viscosity at $(T_p-10)°$ C. which is at least 5 times its viscosity at $(T_p+10)°$ C.

29. A composition according to claim 18 wherein the matrix material and the RHM and the relative amounts thereof are such that the composition, in the absence of any solid non-polymeric fillers, has a viscosity at 20° C. which is at least 5 times the viscosity at 20° C. of a composition which is identical except that it does not contain the RHM.

30. A composition according to claim 18 wherein $(T_p-T_o)$ is less than 10° C. and $T_p$ is from 35° C. to 70° C.

31. A composition according to claim 24 wherein the matrix material comprises precursors for acrylate polymer and the second monomer is an alkyl acrylate or an alkyl methacrylate in which the alkyl group contains 1 to 4 carbon atoms.

32. A composition according to claim 18 wherein the matrix material comprises precursors for an epoxy resin.

33. A composition according to claim 18 which is in the form of a sheet molding composite.

34. A composition according to 18 which is at a temperature below $T_o$ and in which, when the composition is heated from $(T_p-10)°$ C. to $(T_p-10)°$ C., there is an increase by a factor of less than 5 in the effective concentration of each of the materials which takes place in the reaction which forms the crosslinked polymer.

35. A polymeric composition which comprises
1. a matrix material which
    (a) provides a continuous phase, and
    (b) comprises precursors which will react together to form a crosslinked polymer; and
2. a rheological modifier (RHM) which
    (a) comprises a crystalline polymer having an onset of melting temperature $T_o$ and a peak melting temperature $T_p$ which is (i) from 20° C. to 200° C., and (ii) such that $T_p-T_o$ is less than $T_p^{0.6}$, at least 10% by weight of the crystalline polymer being present in the form of discrete volumes which do not contain any material which takes part in the reaction which forms the crosslinked polymer,
    (b) is uniformly distributed in the matrix material,
    (c) is at least partially soluble in the matrix material when the composition is subjected to a treatment which consists of
    maintaining the composition at a temperature above $T_p$ under conditions such that the precursors do not react together to form a crosslinked resin, and
    (d) becomes at least partially insoluble in the matrix material when the composition is subjected to said treatment at a temperature above $T_p$ and is then cooled to a temperature below $T_o$;

the composition
- (A) having a viscosity above $T_p$ which is less than its viscosity below $T_p$; and
- (B) having a viscosity at a temperature below $T_o$ which is substantially greater than the viscosity at the same temperature of a composition which is identical except that it does not contain the rheological modifier.

36. A composition according to claim 35 wherein $T_p$ is from 25 to 120° C. and $(T_p-T_o)$ is less than 10° C.

37. A composition according to claim 35 which is a temperature below $T_o$ and in which at least 30% by weight of the crystalline polymer is present in the form of discrete volumes which do not contain any material which takes part in the reaction which forms the crosslinked polymer.

38. A composition according to claim 35 wherein the matrix material and the RHM and the relative amounts thereof are such that the composition, in the absence of any solid non-polymeric fillers, has a viscosity at $(T_p-10)°$ C. which is at least 5 times its viscosity at $(T_p+10)°$ C.

39. A composition according to claim 35 wherein the matrix material comprises an unsaturated polyester and a copolymerizable monomer.

40. A composition according to claim 39, wherein the copolymerizable monomer is styrene.

41. A composition according to claim 35 wherein the matrix material comprises precursors for acrylate polymer.

42. A composition according to claim 35 wherein the matrix material comprises precursors for an epoxy resin.

43. A composition according to claim 35 which is in the form of a sheet molding composite.

44. A composition according to claim 35 which is at a temperature below $T_o$ and in which, when the composition is heated from $(T_p-10)°$ C. to $(T_p+10)°$ C., there is an increase by a factor of less than 5 in the effective concentration of each of the materials which takes place in the reaction which forms the crosslinked polymer.

45. A polymeric composition which comprises 1. a matrix material which (a) provides a continuous phase, and (b) comprises precursors which will react together to form a crosslinked polymer; and 2. a rheological modifier (RHM) which (a) comprises a crystalline polymer having an onset of melting temperature $T_o$ and a peak melting temperature $T_p$ which is (i) from 20° C. to 200° C., and (ii) such that $T_p-T_o$ is less than $T_p^{0.6}$, at least 10% by weight of the crystalline polymer being present in the form of discrete volumes which do not contain any material which takes part in the reaction which forms the crosslinked polymer, (b) is uniformly distributed in the matrix material, (c) is at least partially soluble in the matrix material when the composition is subjected to a treatment which consists of maintaining the composition at a temperature above $T_p$ under conditions such that the precursors do not react together to form a crosslinked resin, and (d) becomes at least partially insoluble in the matrix material when the composition is subjected to said treatment at a temperature above $T_p$ and is then cooled to a temperature below $T_o$;

the composition (A) having a viscosity above $T_p$ which is less than its viscosity below $T_p$; and (B) having a viscosity at a temperature below $T_o$ which is substantially greater than the viscosity at the same temperature of a composition which is identical except that it does not contain the rheological modifier; and, when the composition is heated from $(T_p-10)°$ C. to $(T_p+10)°$ C., there being an increase by a factor of less than 50 in the effective concentration of each of the materials which take part in the reaction which forms the crosslinked polymer.

46. A composition according to claim 45 wherein $T_p$ is from 25 to 120° C. and $(T_p-T_o)$ is less than 10° C.

47. A composition according to claim 45, wherein, when the composition is heated from $(T_p-10)°$ C. to $(T_p+10)°$ C., there is an increase by a factor of less than 5 in the effective concentration of each of the materials which takes part in the reaction which forms the crosslinked polymer.

48. A composition according to claim 45 wherein the matrix material and the RHM and the relative amounts thereof are such that the composition, in the absence of any solid fillers, has a viscosity at $(T_p-10)°$ C. which is at least 5 times its viscosity at $(T_p+10)°$ C.

49. A composition according to claim 45 wherein the matrix material comprises an unsaturated polyester and a copolymerizable monomer.

50. A composition according to claim 49, wherein the copolymerizable monomer is styrene.

51. A composition according to claim 45 wherein the matrix material comprises precursors for acrylate polymer.

52. A composition according to claim 45 wherein the matrix material comprises precursors for an epoxy resin.

53. A composition according to claim 45 which is in the form of a sheet molding composite.

* * * * *